July 29, 1941. U. O. LONG Re. 21,868
RAILROAD TIE
Original Filed March 11, 1939 2 Sheets-Sheet 1
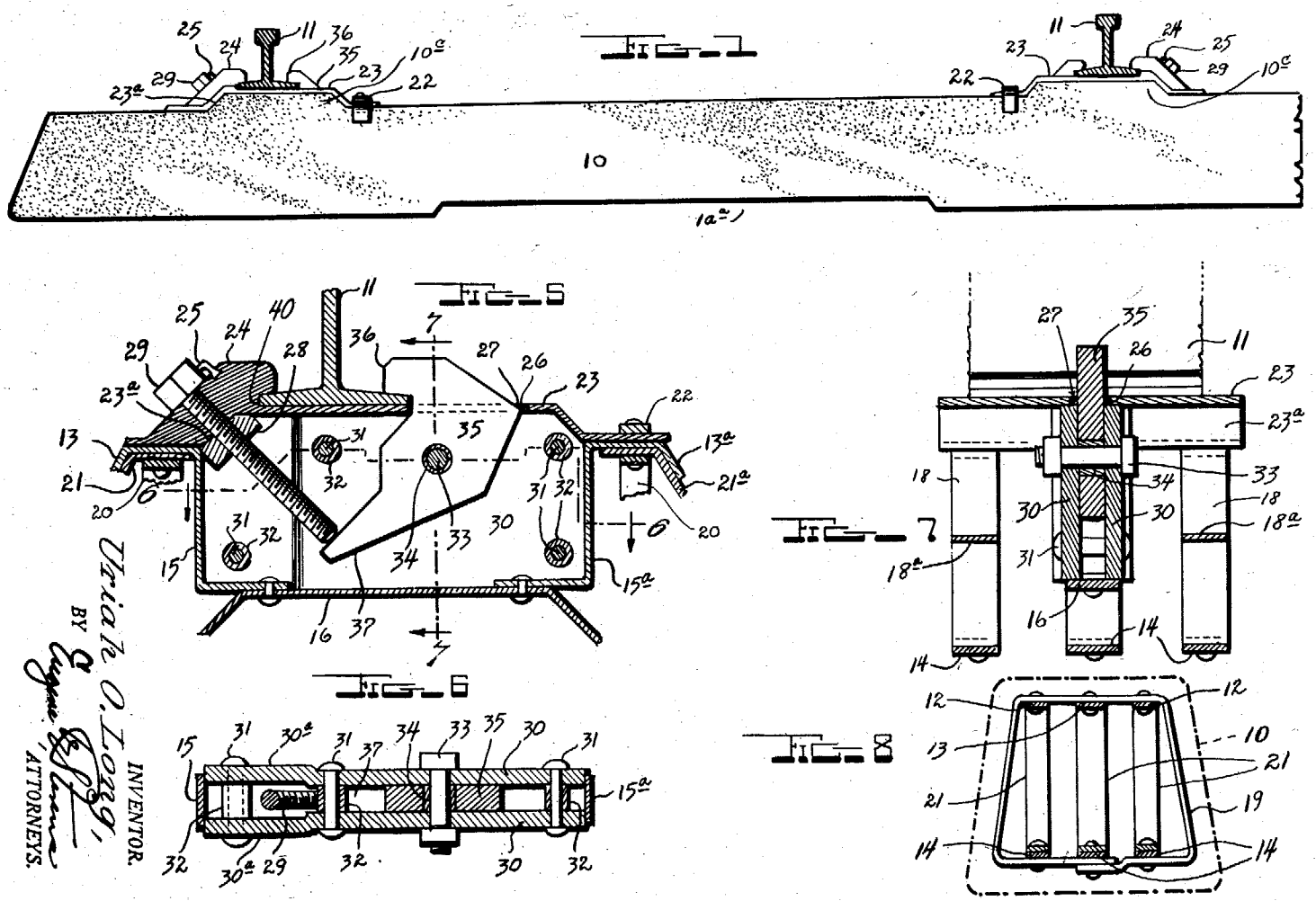
INVENTOR.
Uriah O. Long,
BY Eugene E. Stone
ATTORNEYS.

July 29, 1941. U. O. LONG Re. 21,868
RAILROAD TIE
Original Filed March 11, 1939 2 Sheets-Sheet 2
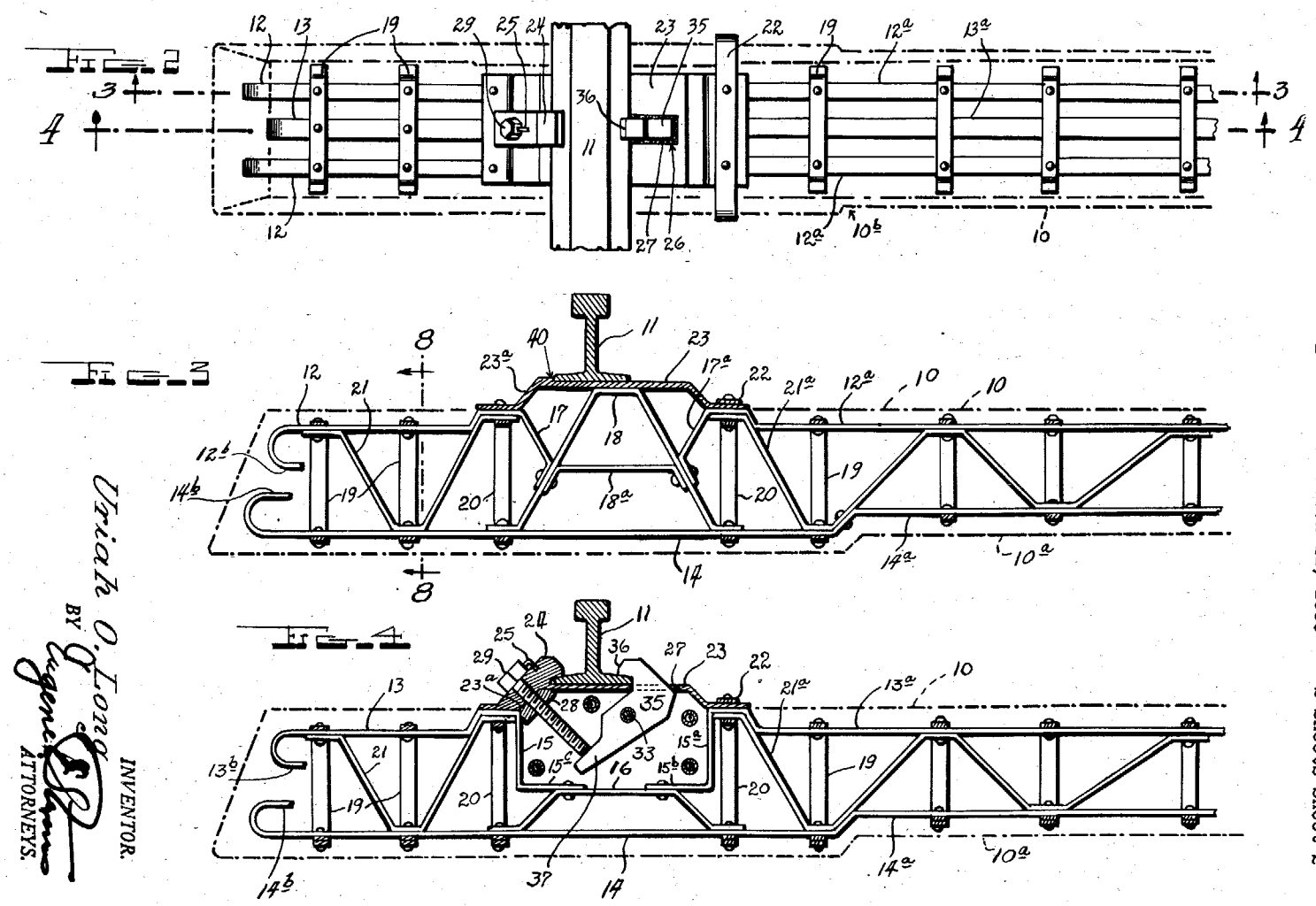
INVENTOR.
Uriah O. Long
BY Eugene E. Stone
ATTORNEYS.

Reissued July 29, 1941 Re. 21,868

UNITED STATES PATENT OFFICE 21,868

RAILROAD TIE

Uriah O. Long, Alhambra, Calif.

Original No. 2,220,533, dated November 5, 1940, Serial No. 261,325, March 11, 1939. Application for reissue January 28, 1941, Serial No. 376,402

2 Claims. (Cl. 238—356)

My invention relates to railroad ties and more particularly to molded railroad ties composed of plastic material such as concrete or the like.

An object of my invention is to provide an improved molded railroad tie.

A further object is to provide such a tie incorporating novel reinforcing means.

A further object is to provide such a tie combined with novel rail fastening means.

A further object is to provide such a tie combined with novel rail fastening means, wherein said rail fastening means is housed within said tie.

A still further object is to provide a combined railroad tie and rail fastening means and including actuating means for said fastening means.

A further object is to provide a combined railroad tie, movable rail fastening means housed in said tie, actuating means for said rail fastening means, and locking means for locking said rail fastening in an operative position.

A further object is to provide a combined railroad tie and rail fastening means housed therein, said fastening means being movable into and out of a rail fastening position, actuating means for said rail fastening means, and means for protecting said rail fastening means against the weather.

A further object is to provide novel means for attaching a railroad rail to a railroad tie.

A further object is to provide novel means for attaching a railroad rail to a tie and a housing for said attaching means.

Other objects and advantages reside in the parti-structure of my invention, combination and arrangement of the several parts, and in the particular mode of operation—all of which will be readily apparent to those skilled in the art upon reference to the detailed description to follow in connection with the drawings forming a part of this specification.

In the drawings:

Figure 1 is a partial elevation of my improved tie applied to a pair of rails;

Figure 2 is an enlarged partial plan thereof with the tie outlined in broken lines for clarity;

Figure 3 is a longitudinal vertical section taken substantially on the line 3—3 of Figure 2;

Figure 4 is a longitudinal vertical section taken substantially on the line 4—4 of Figure 2;

Figure 5 is an enlarged fragmentary vertical section of substantially the same plane as Figure 4 and showing the rail fastening means;

Figure 6 is a generally horizontal section taken on line 6—6 of Figure 5;

Figure 7 is a transverse vertical section taken substantially on the line 7—7 of Figure 5; and Figure 8 is a transverse vertical section taken on the line 8—8 of Figure 3.

In the drawings, wherein like reference characters have been used throughout the several views to designate like parts, 10 designates generally my improved tie having rails 11 applied thereto. The bottom of the central portion of the tie 10 may be recessed as at 10*a* and the sides thereof recessed as at 10*b* (Fig. 2). The recesses 10*a* and 10*b* reduce the weight and thereby the cost of the tie. Moreover, the bottom recess 10*a* serves as means for preventing the endwise sliding of the tie on the ballast. The rail supporting zones of the tie 10 may be raised slightly above the upper surface, as at 10*c*, to provide additional strength. Moreover, the raised portion 10*c* facilitates the operation of the clamping means, as will appear later. Referring particularly in Figures 2, 3, 4 and 8 it will be seen that the tie 10 is suitably reinforced inwardly thereof by a plurality of longitudinally extending reinforcing members 12, 13, 12*a*, 13*a* and 14. The reinforcing members 14 may be termed the lower reinforcing members and extend from end to end of the tie adjacent the lower surface thereof. The central portions of the members 14 may be offset upwardly as at 14*a* to conform to the contour of the lower surface of the tie 10 where the offset 10*a* occurs. The ends of the members 14 may be suitably formed as at 14*b* to anchor them firmly in the tie 10.

The upper reinforcing members 12, 12*a*, 13 and 13*a* are embedded in the tie 10 adjacent the upper surface thereof. Their ends 12*b* and 13*b* may be formed to anchor them in the tie 10. The reinforcing members 13 are positioned centrally of the tie adjacent the upper surface thereof and extend inwardly from a point near the end of the tie to a point in the region of the rail supporting zone of the tie. The reinforcing members 12 lie upon either side of the members 13 in the same horizontal plane and extend inwardly from the end of the tie substantially the same distance as the latter members. The innner ends of the members 12 are downwardly turned as at 17 and secured to the outer legs of an A-shaped member 18.

The ends 17 of the members 12 are secured to the legs of the member 18 in any suitable manner as by rivets, welding, or the like. The member 18 has a flat apex and supports thereon a tie plate 23, to be described later. The legs of the member 18 are connected by a horizontal brace 18a. The opposite or inner legs of the member 18 are secured to the downwardly turned ends 17a of the bracing members 12a which span the central portion of the tie 10 in substantially the same vertical and horizontal planes as the members 12. The reinforcing members 13a are positioned intermediate the reinforcing members 12a near the upper surface of the tie 10 and their outer ends terminate in vertically downwardly bent portions 15a and horizontal terminal portions 15b, in the rail supporting zones of the tie 10. The inner ends of the members 13 have vertically downwardly bent portions 15 and horizontally bent terminal portions 15c in alignment with the portions 15b of the members 13a.

The corresponding upper and lower longitudinal reinforcing members are interiorly braced and fastened together by a plurality of diagonal truss members 21 and 21a as shown or in any other suitable manner. The entire reinforcing assembly is suitably further braced and bound together by a plurality of transversely arranged hoop-like reinforcing members 19 and 20 which are arranged in spaced relationship throughout the length of the tie 10 and which surround the longitudinally extending reinforcing means. The entire assembly is connected together into an integral unit by any suitable attaching means such as rivets, welding, or the like.

Referring particularly to Figures 4, 5, 6 and 7, it will be seen that the aligned ends 15c and 15b of the members 13a and 13 are connected together by a horizontally disposed portion of a truss member 16. The portions 15, 15c, 16, 15b and 15a comprise the ends and bottom of a substantially U-shaped housing, in which is mounted the rail fastening means. The sides of the housing are closed by a pair of plates 30 which are connected together by rivets or bolts 31 and which are maintained in spaced relationship by sleeves 32 on the shanks of rivets or bolts 31. The plates 30 may be outwardly flared as at 30a at one end of the housing to provide additional space for the mounting within the housing of a nut 28 which may be secured on the inside of the diagonal surface 23a of the rail supporting plate 23. A rail fastening member 35 is pivotally mounted within the housing and has a thickness corresponding substantially to the space between the plates 30—sufficient clearance being provided, of course, for free movement of the fastener 35. A bolt or rivet 33 and a bearing sleeve 34 thereabout pivotally mount the fastening member 35 in the housing. One end 36 of the member 35 extends outwardly of the plate 23 through a slot-like opening 26 therein. The end 36 of the member 35 is formed to provide hook-like means for engaging the flange of the rail 11 to secure the same to the tie plate 23. A portion of the tie plate 23 opposite the slot 26 is formed to provide a raised abutment 40 against which the opposite edge of the flange of the rail 11 is adapted to bear. The opening 26 in the plate 23 is slightly wider than the thickness of the member 35 and is filled with caulking compound or other sealing means 27 to prevent the entrance of moisture into the interior of the housing. The opposite end 37 of the fastening member 35 is elongated and extends below the rail 11 toward the outer end of the tie and its upper edge provides a bearing surface for the inner end of a bolt 29. The bolt 29 extends through the diagonal portion 23a of the plate 23 and is threaded in the nut 28. The head of the bolt 29 abuts in final position against a boss 24 formed on the plate surface 23a. By providing the raised rail supporting portion 10c, the bolt 29 may extend diagonally downward but, at the same time, the head thereof is positioned above the tie surface where it is readily accessible at all times. Thus the rail can be removed without disturbing the ballast in which the tie is set and without the use of special tools. A bolt-key 25 is formed on the boss 24 and engages the head of the bolt 29 to lock the same in a predetermined position. As is apparent from Figure 5, the shape and center of gravity of the fastening member 35 is such that it normally tends to drop within the housing into an inoperative position, however the end 37 of fastener 35 is engageable by the inner end of the bolt 29 to move the toe or hook 36, outwardly of the housing into a rail engaging position. The rail plate 23 is suitably secured to the reinforcing frame assembly in any suitable manner as by rivets, bolts, welding or the like and one side of each plate 23 may be further held in place by a bar 22. The bars 22 extend transversely of the tie 10 and outwardly thereof to provide hand holds or means for attaching the ties to a hoisting sling or other lifting means.

While I have shown and described what is now thought to be the preferred form of my invention, yet it is obvious that the same is susceptible of other forms and embodiments. I do not, therefore, wish to limit myself to the precise structure shown and described except as hereinafter claimed.

I claim:

1. In a device for clamping a railroad rail to a tie, including a housing formed in the upper surface of the tie and a swingable clamp supported in said housing for swingably engaging and releasing a rail; a plate covering said housing and having base portions flatly engaging said tie, a parallel upwardly offset portion between said base portions, and inclined portions connecting said base and offset portions, said offset portion providing a rail supporting zone adjacent one of said inclined portions, a boss formed on said last named inclined portion adjacent said rail supporting zone, a slot formed through said offset portion adjacent the other inclined portion, said clamp comprising a bell crank swingably mounted in said housing and having one arm providing rail clamping means extensible through said slot, the other arm of said crank being downwardly inclined below said rail supporting zone, a screw bolt threaded through said boss and its inclined portion of said plate, said bolt extending diagonally downward into said housing below said rail supporting zone with its inner end converging with and bearing on said second arm of said crank to comprise actuating means for said crank.

2. In a device for clamping a railroad rail to a tie, including a housing formed in the upper surface of the tie and a swingable clamp supported in said housing for swingably engaging and releasing a rail; a plate covering said housing and having base portions flatly engaging said tie, a parallel upwardly offset portion between said base portions, and inclined portions connecting said base and offset portions, said offset portion providing a rail supporting zone adjacent one of said inclined portions, rail clamping means supported by said last named inclined portion adjacent said rail supporting zone, a slot formed through said offset portion adjacent the other inclined portion, said clamp comprising a bell crank swingably mounted in said housing and having one arm providing rail clamping means extensible through said slot, the other arm of said crank being downwardly inclined below said rail supporting zone, a screw bolt extended through said first named rail clamping means and threaded in the inclined portion of said plate, said bolt extending diagonally downward into said housing below said rail supporting zone with its inner end converging with and bearing on said second arm of said crank to comprise actuating means for said crank.

URIAH O. LONG.